(12) United States Patent
Ahn

(10) Patent No.: US 6,505,226 B1
(45) Date of Patent: Jan. 7, 2003

(54) HIGH SPEED PARALLEL ADDER

(75) Inventor: Young-Jun Ahn, Daeku (KR)

(73) Assignee: Hyundai Electronics Industries Co., Ltd., Ichon (KR)

(*) Notice: Subject to any disclaimer, the term of this patent is extended or adjusted under 35 U.S.C. 154(b) by 727 days.

(21) Appl. No.: 08/921,701

(22) Filed: Sep. 2, 1997

(30) Foreign Application Priority Data

Sep. 6, 1996 (KR) .............................................. 96-38612

(51) Int. Cl.$^7$ ................................................. G06F 7/57
(52) U.S. Cl. ...................................... 708/707; 708/703
(58) Field of Search ....................... 364/786.02, 784.04, 364/754.03

(56) References Cited

U.S. PATENT DOCUMENTS

| | | | | |
|---|---|---|---|---|
| 4,052,604 A | * | 10/1977 | Maitland et al. | 364/786.02 |
| 4,901,264 A | * | 2/1990 | Stoelzle | 364/784.04 |
| 4,931,981 A | * | 6/1990 | Knauer | 364/784.04 |
| 4,970,677 A | * | 11/1990 | Young | 364/784.04 |
| 5,233,233 A | * | 8/1993 | Inoue et al. | 364/784.03 |
| 5,343,418 A | * | 8/1994 | Zinger | 364/784.03 |

OTHER PUBLICATIONS

Mavor, "Introduction to MOS LSI design", 1983 Addison, Wesley Publishers Limited, pp. 90–91.*

* cited by examiner

Primary Examiner—Tan V. Mai
(74) Attorney, Agent, or Firm—Fleshner & Kim, LLP

(57) ABSTRACT

A parallel adder of the present invention operates at high speed and is reduced in size. The parallel adder outputs a carry signal from an inverter and a NAND-gate/NOR-gate to more rapidly generate the carry signal and selects a pass transistor after being passed through the NAND-gate/NOR-gate to reduce a layout surface. The parallel adder includes first and second full adders, each having a logic combination unit, a buffer, a carry output unit, an output controller unit and a sum output unit. The logic combination unit performs logical operations between input signals to generate a first control signal. The buffer inverts a carry input signal in accordance with the control of the logic combination unit, and the carry output unit generates a carry signal in accordance with the control of the logic combination unit to output the output signal from the buffer as a carry signal. The output controller logically combines the output signal from the logic combination unit and generates a second control signal. The sum output unit controlled by the sum output controller receives the carry input signal, and the first and second control signals and generates a sum output signal. The second full adder receives the first full adder output carry signal as its carry input signal.

17 Claims, 7 Drawing Sheets

HIGH SPEED PARALLEL ADDER

BACKGROUND OF THE INVENTION

1. Field of the Invention

The present invention relates to a parallel adder, and in particular, to a parallel adder that performs high speed operations.

2. Background of the Related Art

Figure 1A:
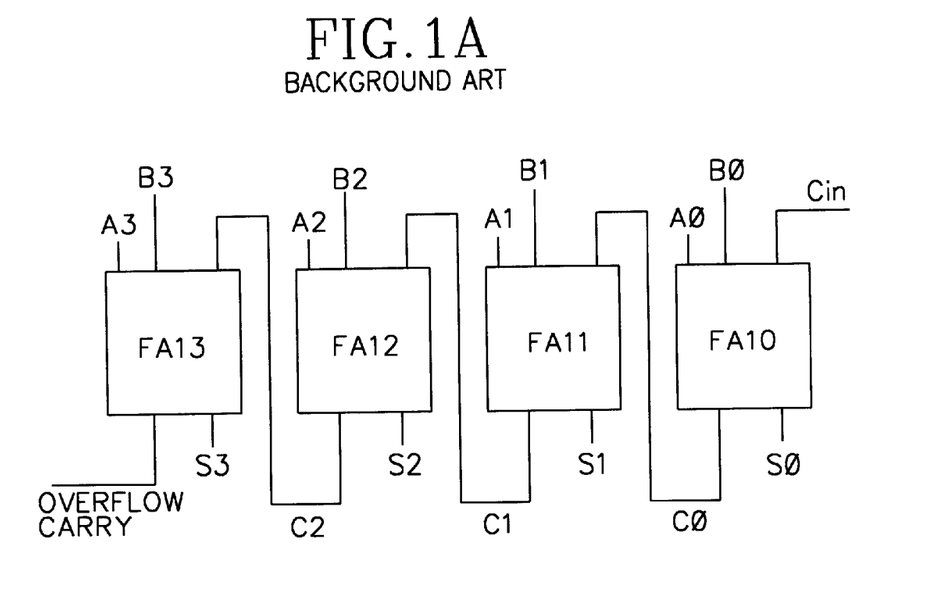
FIG. 1A is a block diagram illustrating a related art ripple carry type adder.

FIG. 1A is a block diagram illustrating a related art ripple carry type adder in which a carry generated by a lower full adder is inputted as an additional input signal of an upper full adder, which is adjacent the a lower full adder. As shown in FIG. 1A, in a first full adder FA10, input signals A0, B0 and a carry input signal $C_{in}$ are added to output a sum signal S0. A carry signal C0 is output from the first full adder FA10 to be an input signal for a second full adder FA11. The second full adder FA11 adds input signals A1, B1, and the carry input signal C0 to output a sum signal S1. The carry signal C1 is inputted to a third full adder FA12 as an input signal. The above-described processes are performed as many times as the prescribed number of bits.

Figure 1B:
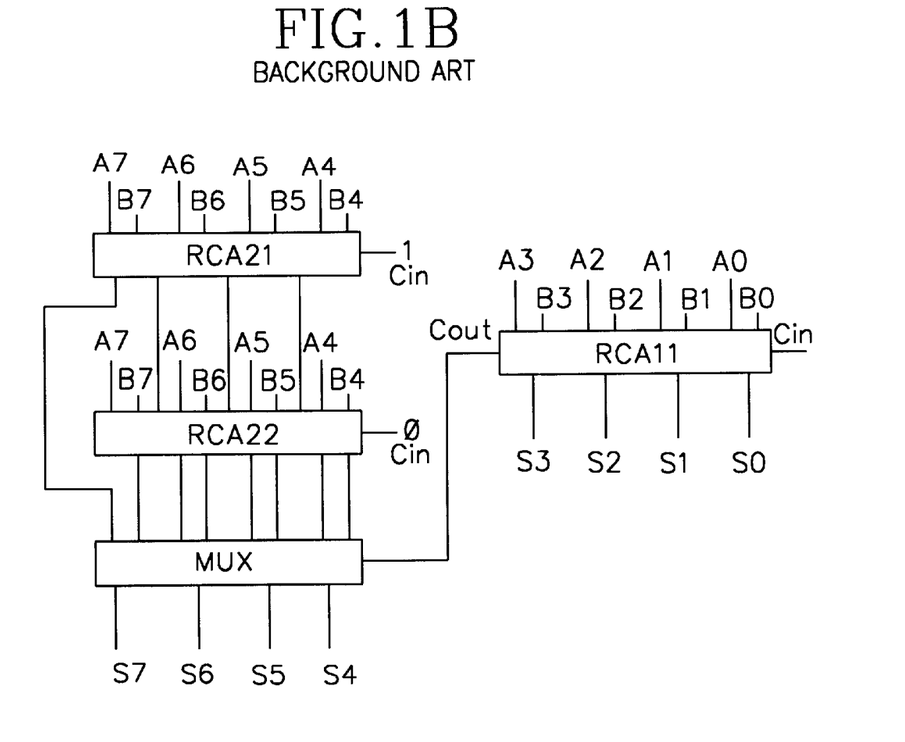
FIG. 1B is a block diagram illustrating a related art carry selection type adder.

FIG. 1B is a block diagram illustrating a related art carry selection type adder. In an adder RCA21, on the assumption that there is a carry signal, an addition operation is performed. In an adder RCA22, on the assumption that there is not a carry signal, an addition operation is performed. As a result of the actual addition by an adder RCA11, the addition result of either the adder RCA21 or the adder RCA22 is selected and outputted through a multiplexor MUX. The addition result is selected based on whether the carry signal from the adder RCA11 is present.

In other words, in the adder RCA11, four bit input signals (A0, B0), (A1, B1), (A2, B2) and (A3, B3) are added to output the carry input signal $C_{in}$ and four bit sum output signals S0 through S3. Additionally, in the adder RCA21, on the assumption that there is a carry signal $C_{in}(C_{in}=1)$, four bit input signals (A4, B4), (A5, B5), (A6, B6), (A7, B7) and a carry input signal $(C_{in})$ are added to output four bit sum output signals S4 through S7. In the adder RCA22, on the assumption that there is not a carry signal $C_{in}(C_{in}=0)$, four bit input signals (A4, B4), (A5, B5), (A6, B6), (A7, B7) and a carry input signal $C_{in}(C_{in}=0)$ are added to output and four bit sum output signals S4 through S7.

When the actual addition is performed by the adder RCA11, the carry output signal $C_{out}$ having the value "1" may be generated, or the carry output signal $C_{out}$ may not be generated, so that the value thereof may be "0". When the array output signal $C_{out}$ is generated, the multiplexor MUX is controlled in accordance with the carry output signal $(C_{out}=1)$, and the sum output signal of the adder RCA21 is selected and outputted. When the carry output signal $C_{out}$ is not generated, the multiplexor MUX is controlled in accordance with the carry output signal $(C_{out}=0)$, and the sum output signal from the adder RCA22 is selected and outputted.

Figure 2A:
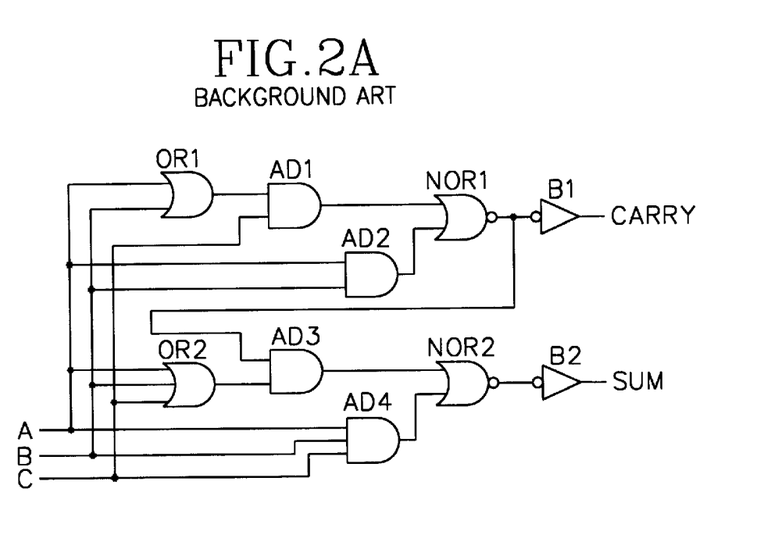
FIG. 2A is a circuit diagram illustrating a related art full adder.

FIG. 2A is a circuit illustrating a related art full adder. In FIG. 2A, when input signals A and B are both high level (i.e., a logic value of "1") and a carry signal C is high level or "1", an OR-gate OR1 outputs "1", and an AND-gate AD1 outputs "1". In addition, a NOR-gate NOR1 outputs "0" irrespective of the output from an AND-gate AD2. The output value "0" from the NOR-gate NOR1 is inverted to "1" by an inversion buffer B1, and the carry signal is outputted as "1".

Figure 2B:
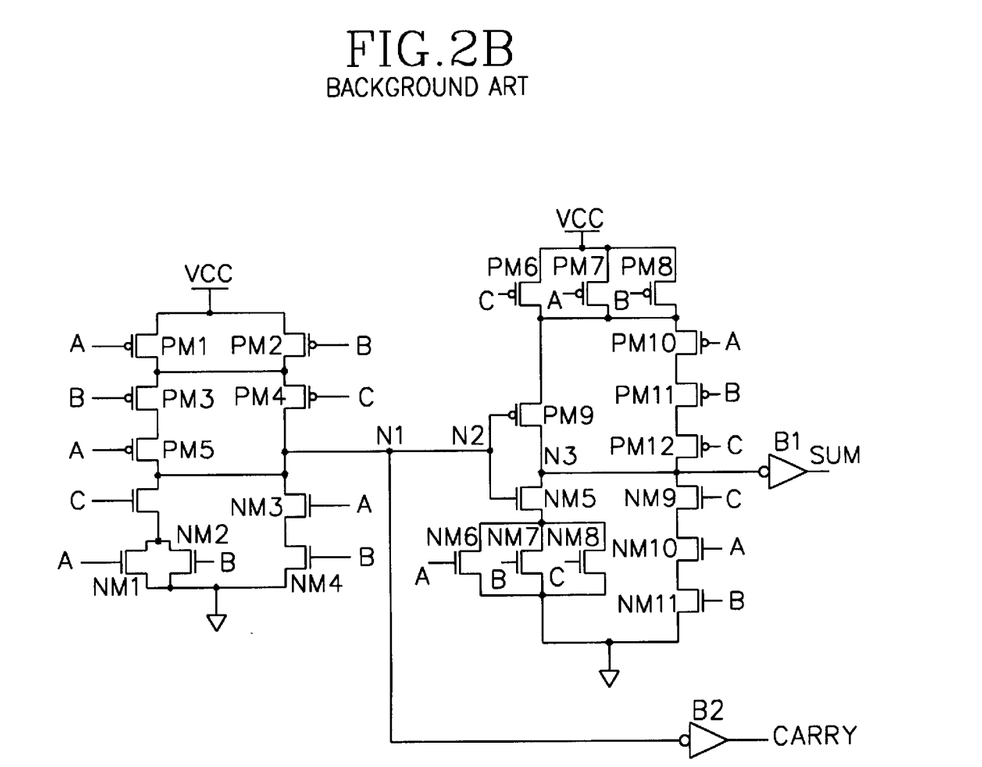
FIG. 2B is a circuit diagram illustrating another related art full adder.

FIG. 2B is a detailed circuit diagram illustrating a related art full adder. In FIG. 2B, when input signals A and B are both "1", and a carry signal C is "1", PMOS transistors PM1–PM4 are turned off. Thus, "0" is outputted from a node N1. The outputted value "0" from the node N1 is inverted to "1" by an inversion buffer B2, and a carry signal is outputted as "1".

In addition, a PMOS transistor PM9 is turned on in accordance with a value "0" outputted from the node N1. Since PMOS transistors PM6–PM8 and PMOS transistors PM10–PM12 are all turned off, "0" is outputted from common nodes N2 and N3. The outputted value "0" from the node N3 is inverted to "1" by the inversion buffer B1, and the sum is outputted as "1".

Figure 3A:
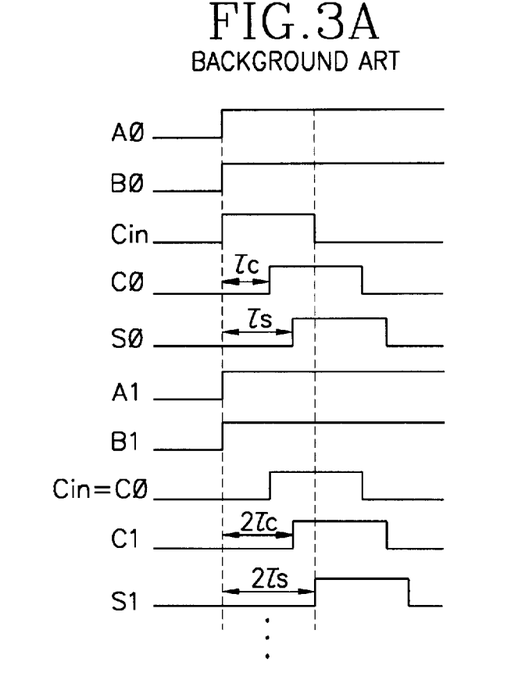
FIG. 3A is a diagram illustrating an output timing of a related art ripple type adder.

FIG. 3A is a diagram illustrating an output timing of a related art ripple type adder. As shown in FIG. 3A, in a full adder FA10, input signals A0 and B0 and a carry input signal $C_{in}$ are added, and a delay time of τc is generated until a carry output signal C0 is generated. In a full adder FA11, input signals A1 and B1 and a carry input signal $(C_{in}=C0)$ are added, and a delay time of τc is generated until the carry output signal C1 is generated. Accordingly, a total delay time of 2τc is generated before the carry output signal C1.

Since the delay time of τc is generated from each full adder, a total delay time of 8τc is generated by an 8 bit ripple carry type parallel adder. In other words, since an addition operation is performed in order by the upper full adder after a carry output signal is generated by the preceding lower full adder, a relatively large amount of delay time (a processing time) is required.

Figure 3B:
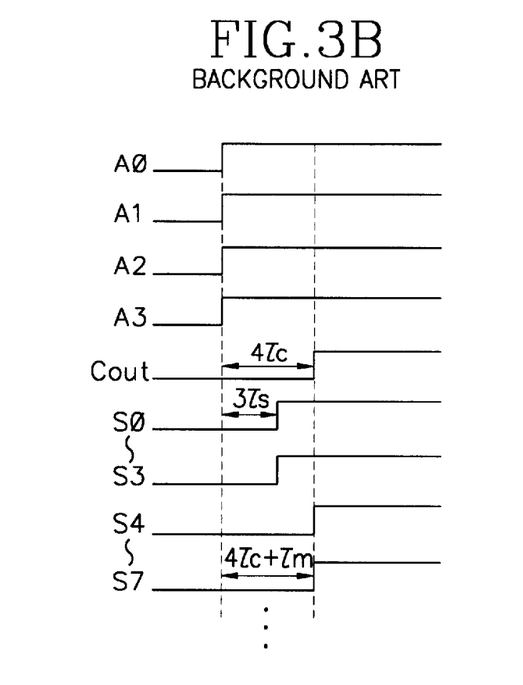
FIG. 3B is a diagram illustrating an output timing of a related art carry selection type adder.

FIG. 3B is a diagram illustrating an output timing of a related art carry selection type adder. As shown in FIG. 3B, in the RCA11, four bits input signals (A0, B0), (A1, B1), (A2, B2), (A3, B3) and a carry input signal $C_{in}$ are added, and a delay time of 4τc is generated until the carry output signal $C_{out}$ is generated. However, since the remaining addition operations are performed by the adders RCA21 and RCA22, a no additional delay time is required. A delay time of τc for a selection operation of the multiplexor MUX is added in accordance with a carry output signal $C_{out}$ from the adder RCA11. Thus, a total delay time of 5τc is generated.

The related art adders have various disadvantages. As described above, in the ripple carry type adder, since the addition operation is performed sequentially by the upper adder after a carry output signal is generated by the lower adder, the delay time is generated proportionally to the number of output bits. In the carry selection type parallel adder, since the upper adder is arranged in parallel, it is possible to slightly reduce the delay time. In other words, when a carry output is outputted from the lower adder, a predetermined result value is selected and outputted in accordance with the actual addition operation. However, the surface of the parallel adder is necessarily increased due to a laminated structure of the system.

SUMMARY OF THE INVENTION

An object of the present invention to provide a parallel adder that overcomes at least the problems and disadvantages in the related art.

Another object of the present invention to provide a parallel adder that generates a carry signal more rapidly.

A further object of the present invention is to provide a parallel adder having a reduced size/layout.

A further object of the present invention is to provide a parallel adder that selects a pass transistor after passing a carry signal through the NAND-gate/NOR-gate to reduce a layout surface when generating a sum output signal.

Still another object of the present invention is to provide a parallel adder for a digital signal processor (DSP).

To achieve the above objects, features and/or advantages in whole or in part, there is provided a parallel adder that includes a first full adder including a logic combination unit for NORing and NANDing input signals and for generating a control signal, a buffer for inverting an inverted carry input signal in accordance with the control of the logic combination unit, a carry output unit for generating a carry signal in accordance with the control of the logic combination unit and for outputting the output signal from the buffer as a carry signal, an output controller for logically combining the output signal from the logic combination unit and for generating a control signal, and a sum output unit controlled by the sum output controller for receiving the inverted carry signal and for generating a sum output signal, and a second full adder including a logic combination unit, a buffer, and a carry output unit for receiving inverted input signals from the inverters and a carry input signal from a first full adder and for generating an inverted carry output signal, a sum output controller having the same construction as the sum output controller, and a sum output unit for receiving the carry input signal and for generating a sum output signal in accordance with the control of the sum output controller, wherein the first and second full adder are formed in a multiple structure.

The present invention may be achieved in a whole or in parts by a parallel adder including a plurality of full adders, wherein each full adder includes a logic combination unit that performs logical operations between input signals to generate a first control signal, a carry output unit receiving a carry input signal to generate a carry output signal based on the first control signal and a sum output controller for logically combining the first control signal to generate a second control signal and generating a sum output signal based on the second control signal and the carry input signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
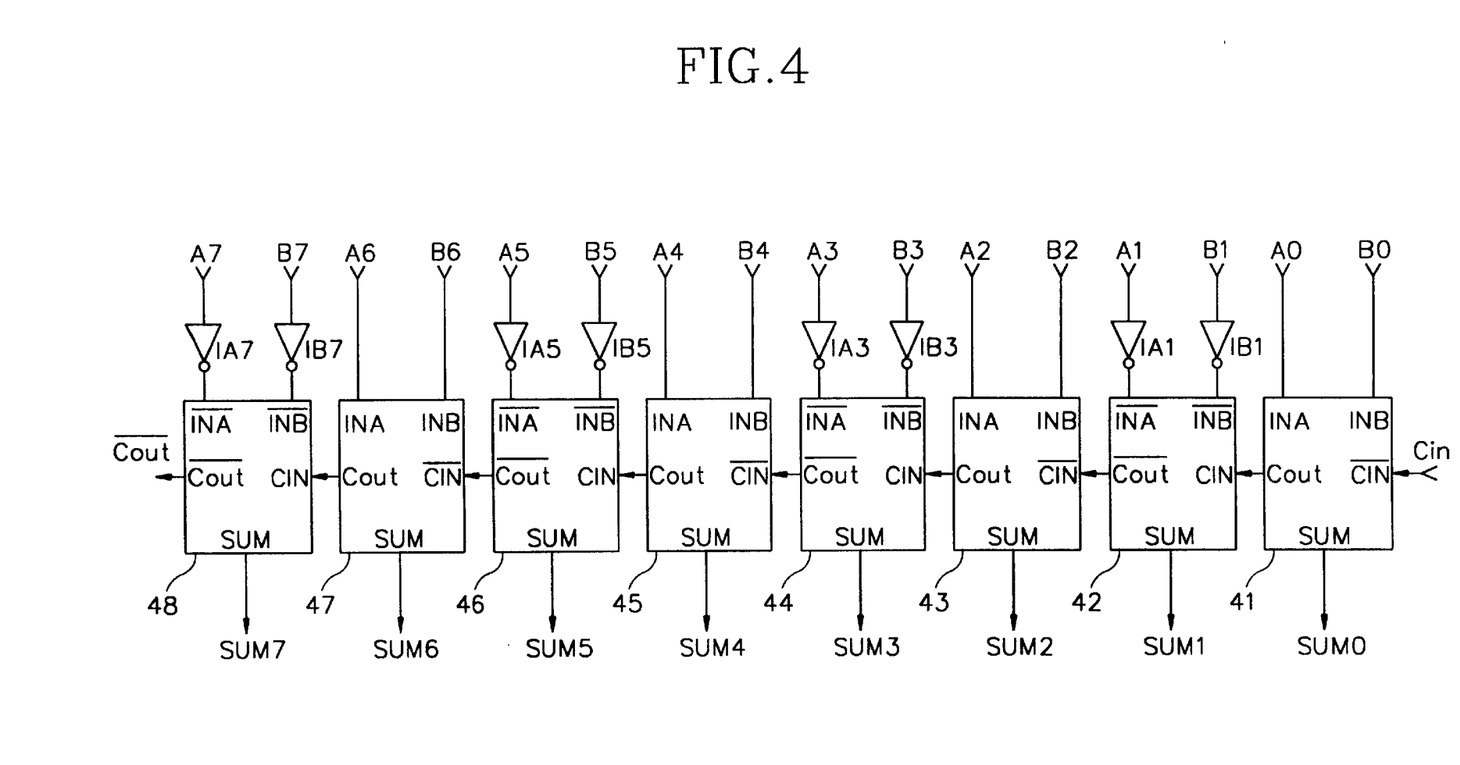
FIG. 4 is a block diagram illustrating a preferred embodiment of a parallel adder according to the present invention.

A first preferred embodiment of a parallel adder according to the present invention will now be described. As shown in FIG. 4, a first full adder 41 is coupled for receiving a carry input signal /CIN, generating a carry output signal COUT from an inverter and a NAND-gate/NOR-gate and a sum output signal SUM by controlling a pass transistor after being passed through the NAND-gate/NOR-gate. A second full adder 42 is coupled for receiving a carry input signal CIN from the first adder 41, generating a carry output signal /COUT through the inverter and the NAND-gate/NOR-gate, receiving input signals /INA and /INB from inverters $I_{A1}$, and $I_{B1}$, and generating a sum output signal SUM for controlling the pass transistor after being passed through the NANDgate/NOR-gate. Full adders 43 through 48 are coupled similarly to the above-described first and second full adders 41 and 42.

Figure 5:
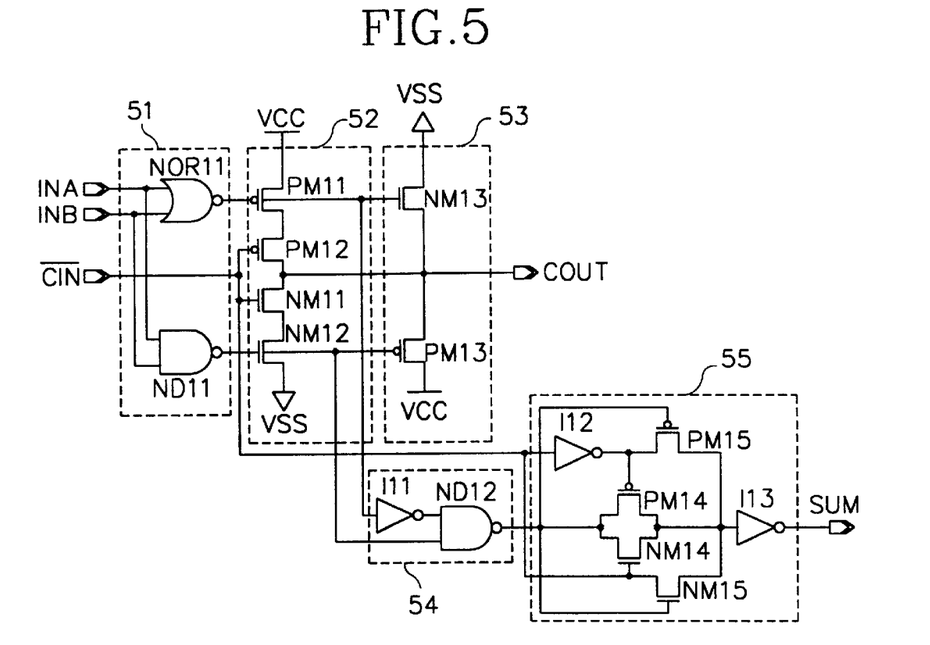
FIG. 5 is a circuit diagram illustrating an (n+1)-th full adder of FIG. 4.

FIG. 5 is a circuit diagram illustrating an (n+1)-th full adder (e.g., the first full adder 41) of FIG. 4. As shown in FIG. 5, a logic combination unit 51 is coupled for NORing and NANDing input signals INA and INB and for generating a control output signal based on the NORing operation. A buffer 52 is coupled for inverting and outputting a carry input signal /CIN based on control by the logic combination unit 51. A carry output unit 53 is coupled for generating a carry output signal COUT based on control by the logic combination unit 51 and the output signal from the buffer 52. A sum output controller 54 is coupled for logically combining the output signal from the logic combination unit 51 and outputting a control output signal. A sum output unit 55 is coupled for receiving a carry input signal /CIN and for generating a sum output signal SUM in accordance with control by the sum output controller 54.

Figure 6:
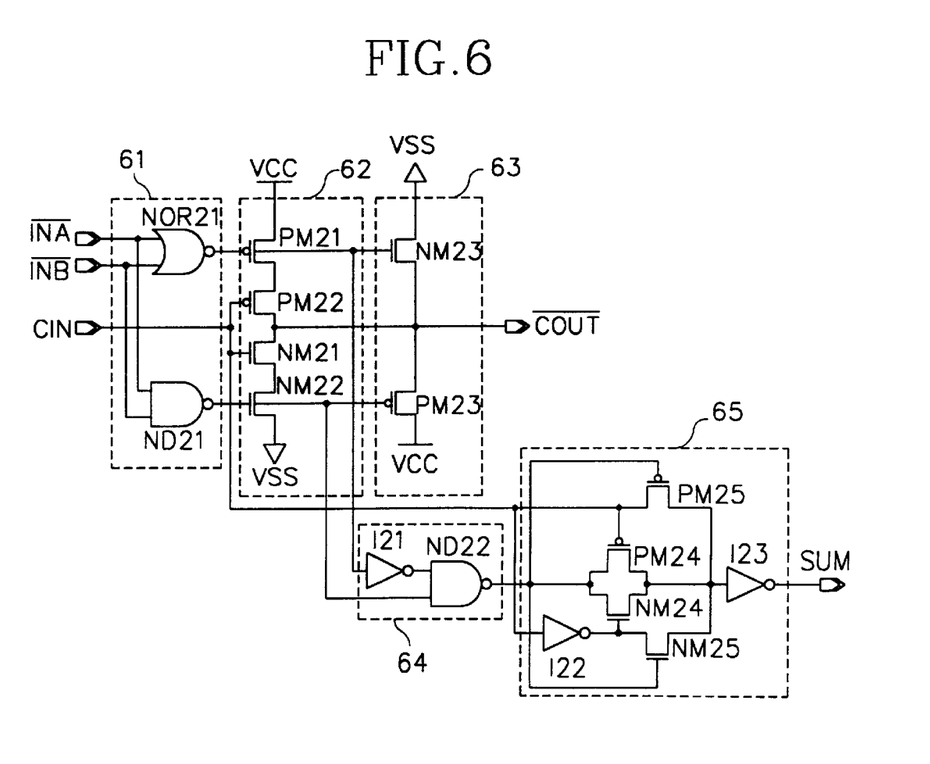
FIG. 6 is a circuit diagram illustrating an n-th full adder of FIG. 4.

FIG. 6 is a circuit diagram illustrating an n-th full adder of FIG. 4 according to the present invention. Different from the operation of FIG. 5, in the n-th full adder (e.g., the second full adder 42), input signals /INA and /INB are inputted through inverters $I_{AN}$ and $I_{BN}$ (e.g., the inverters $I_{A1}$ and $I_{B1}$), and a carry input signal CIN is inputted through the preceding full adder. In addition, the n-th full adder is similar to the (n+1)-th full adder except for a sum output unit 65. In other words, the second full adder 42 is similar to the first full adder 41 except for the sum output unit 65.

Operations and effects of the first preferred embodiment of the parallel adder according to the present invention will now be explained with reference to FIGS. 7A–8D. First, addition operations of the first full adder 41 will be explained with reference to FIG. 5. For an example, "1" is inputted to external input terminals A0 and B0, respectively, and is then inputted to the input terminals INA and INB of the first full adder 41. Further, on the assumption that a carry signal is not externally supplied thereto, "1" is supplied to the carry input terminal /CIN of the first full adder 41.

Since "0" is outputted from the NOR-gate NOR11 and is inputted to the gates of the PMOS transistor PM11 and the NMOS transistor NM13, the PMOS PM11 is turned on and the NMOS transistor NM13 is turned off. In addition, the PMOS transistor PM12 and the NMOS transistor NM11, which work as an inverter based on the carry input signal /CIN, are turned off and turned on, respectively. "0" is outputted from the NAND-gate ND11 in accordance with input signals INA and INB, and the NMOS transistor NM12 is turned off, and the PMOS transistor PM13 is turned on. Thus, an electrode voltage Vcc is supplied to the carry output terminal COUT through the PMOS transistor PM13. In other words, "1" is outputted from the carry output terminal COUT.

Meanwhile, the carry input signal /CIN is directly outputted to the gate of the NMOS transistor NM14. The carry input signal /CIN is inverted to "0" by the inverter I12 and supplied to the gate of the PMOS transistor PM14. Thus, the PMOS transistor PM14 and the NMOS transistor NM14 are both turned on to become an output ready state. "0" outputted from the NOR-gate NOR11 is inverted to "1" by the inverter I11 and supplied to one side of the NAND-gate ND12. The NAND-gate ND11 output "0" is supplied to the other side of the NAND-gate ND12, which outputs "1".

The PMOS transistor PM15 is turned off in accordance with "1" outputted from the NAND-gate ND12, and the NMOS transistor NM15 is turned on. The "1" supplied through the PMOS transistor PM14 (a pass transistor) and the NMOS transistor NM14, is inverted to "0" by the inverter I13 and supplied to the sum output terminal SUM.

As a result, under the above-described operations, a carry output signal COUT of "1" is generated by the first full adder 41. The carry output signal COUT of "1" is supplied to the second full adder 42 as a carry input CIN. The second full adder 42 recognizes that there is a carry input signal. Further, the sum output SUM "0" is outputted from the first full adder 41 and is supplied to the sum output terminal SUM0.

Addition operations of the second full adder 42 are similar to the first full adder 41 and will be described with reference to FIG. 6. First, "1" is respectively supplied to the external input terminals A1 and B1, inverted to "0" by inverters $I_{A1}$ and $I_{B1}$ and supplied to the input terminals /INA and /INB of the second full adder 42. A carry signal is externally supplied, and "1" is supplied to the carry input terminal CIN of the second full adder 42 continuing the example above, from the first full adder 41.

Since "1" is outputted from the NOR-gate NOR21 and supplied to the PMOS transistor PM21 and the NMOS transistor NM23, the PMOS transistor PM21 is turned off and the NMOS transistor NM23 is turned on. In addition, the PMOS transistor PM22 and the NMOS transistor NM21, which work as an inverter based on a carry input signal CIN, are turned off and turned on, respectively. In addition, "1" is outputted from the NAND-gate ND21 in accordance with "0" respectively supplied to the input terminals /INA and /INB. Thus, the NMOS transistor NM22 is turned on, and the PMOS transistor PM23 is turned off.

Therefore, the terminal electrode Vcc is not supplied to the carry output terminal /COUT. Since the ground voltage Vss is supplied to the carry output terminal /COUT through the NMOS transistor NM23, "0" is outputted from the carry output terminal /COUT. Accordingly, the carry output terminal /COUT becomes active.

Meanwhile, the carry input CIN is directly supplied to the gate of the PMOS transistor PM24, which turns off. Further, the carry input CIN is inverted to "0" by the inverter I22 and the NMOS transistor NM24 is turned off. The "1" outputted from the NOR-gate NOR21 is inverted to "0" by the inverter I21 and supplied to one side of the NAND-gate ND22. The "1" outputted from the NAND-gate ND21 is supplied to the other side of the NAND-gate ND22. Thus, "1" is outputted from the NAND-date ND22.

The "1" outputted from the NAND-gate ND22 is directly supplied to the gate of the PMOS transistor PM25 and to the gate of the NMOS transistor NM25. Thus, the PMOS transistor PM25 and the NMOS transistor NM25 are turned off and turned on, respectively. The carry input signal CIN is inverted to "0" by the inverter I22, and becomes a ready state by the NMOS transistor NM25. When the NMOS transistor NM25 is turned on, because "0" is supplied to the input terminal of the inverter I23, "1" is outputted from the inverter I23 and supplied to the sum output terminal SUM.

Under the above-described conditions, the carry output /COUT of "0" is generated by the full adder 42 and is supplied to the carry input /CIN of the third full adder 43. Therefore, the third full adder 43 recognizes that there is a carry input signal, and the sum output signal SUM is outputted from the second full adder 42 and is supplied to the sum output terminal SUM1.

The first and second full adders 41 and 42 operate complementarily. Further, the full adders 43, 45, and 47 operate like the full adder 41, and the full adders 44, 46, and 48 operate like the full adder 42 to generate sum output signals SUM0–SUM7 and the carry output signal /COUT as shown in FIG. 4.

Figure 7A:
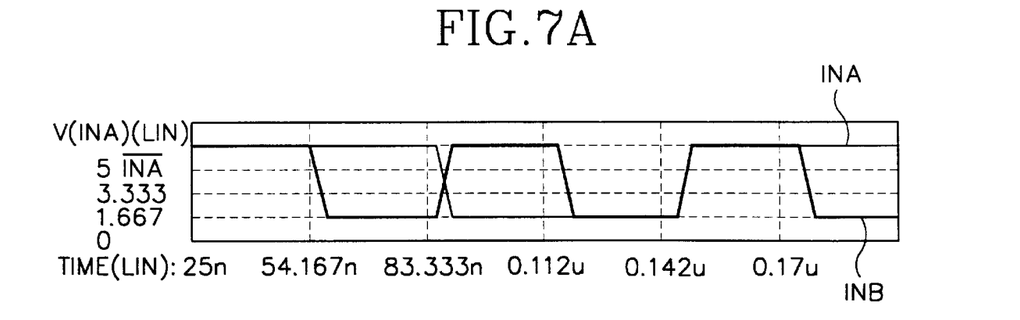
FIGS. 7A–7D are diagrams illustrating signal waveforms of the full adder circuit of FIG. 5.
Figure 7B:
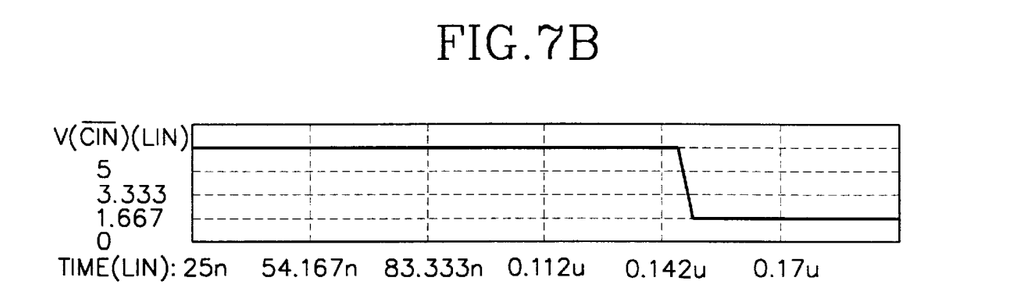
Figure 7C:
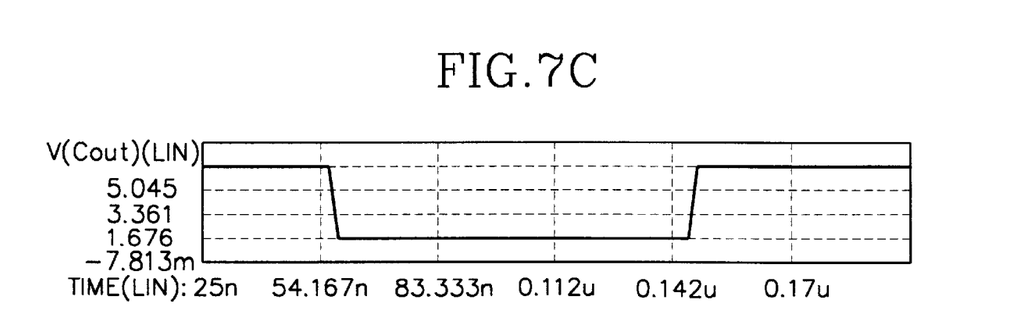
Figure 7D:
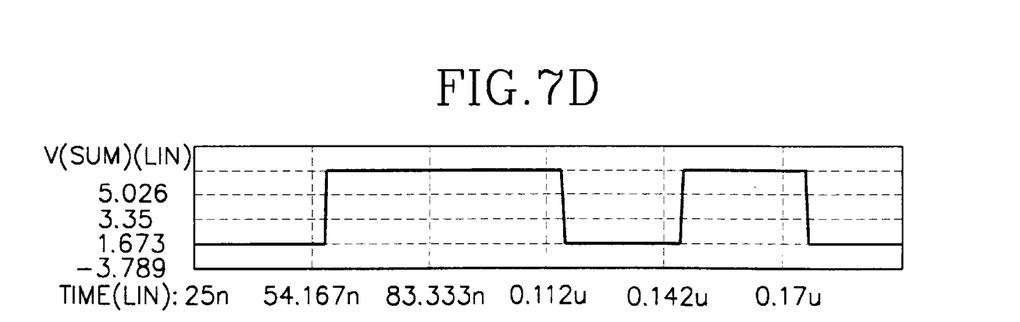

FIGS. 7A–7D are exemplary waveforms illustrating a simulation result of a full adder circuit of FIG. 5. When the input signals INA and /INA are supplied as shown in FIG. 7A and the carry input signal /CIN is supplied as shown in FIG. 7B, the carry input signal COUT is generated as shown in FIG. 7C. Further, the sum output /SUM is generated as shown in FIG. 7D.

Figure 8A:
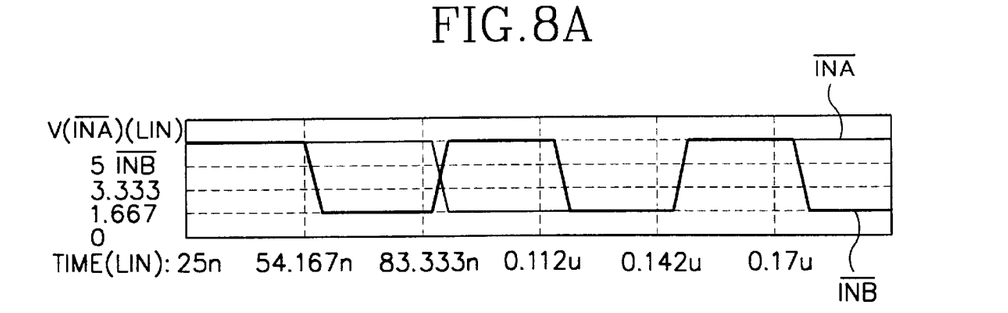
FIGS. 8A–8D are diagrams illustrating signal waveforms of the full adder circuit of FIG. 6.
Figure 8B:
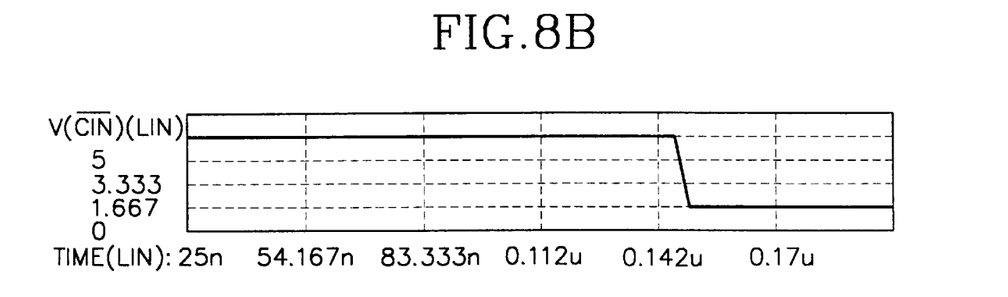
Figure 8C:
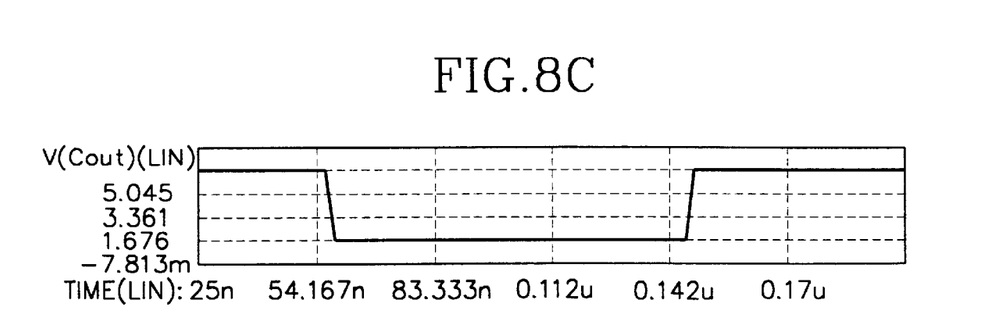
Figure 8D:
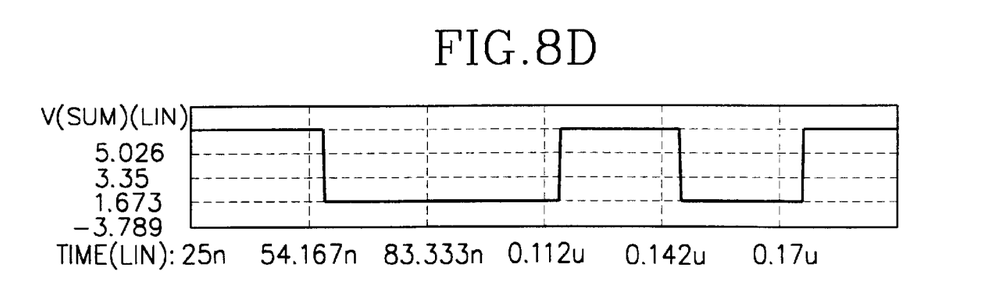

FIGS. 8A–8D are exemplary waveforms illustrating a simulation result of a full adder circuit of FIG. 6. When the input signals /INA and /INB are inputted as shown in FIG. 8A and the carry input signal CIN is supplied as shown in FIG. 8B, the carry output signal /COUT is generated as shown in FIG. 8C. Further, the sum output signals SUM is generated as shown in FIG. 8D.

As described above, the first preferred embodiment of the parallel adder according to the present invention has various advantages. The first preferred embodiment can increase processing speed by three times compared to the related art ripple type adder of eight bits by generating a carry output signal by using an inverter and a NAND-gate/NOR-gate and selecting a pass transistor through the NAND-gate/NOR-gate to generate a sum output signal, which decreases the layout surface to approximately a size of the related art ripple carry adder. Thus, the parallel adder is adaptable to a filter and a multiplexor of a digital signal processor.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A parallel adder, comprising:
   at least one pair of full adders, wherein each of the pair of full adders comprises:
   a logic combination unit for NORing and NANDing input signals to respectively generate a first control signal and a second control signal;
   a buffer comprising a plurality of transistors that buffers a carry input signal based on the first control signal and the second control signal;
   a carry output unit for generating a carry output signal based on the first control signal, the second control signal and the carry input signal;

a sum output controller comprising a logic circuit for logically combining the first and second control signals to generate a third control signal; and a sum output unit that receives the third control signal and the carry input signal to generate a sum output signal, wherein the sum output unit comprises a transmission gate to output the sum output signal based on the third control signal and the carry input signal.

2. The parallel adder of claim 1, wherein the sum output controller logically combines the first and the second control signals using first and second logic gates to generate the third control signal.

3. The parallel adder of claim 1, wherein said buffer couples a power terminal to a ground terminal through serially connected first through fourth transistors, wherein the first control signal is supplied to a control electrode of the first transistor and the second control signal is supplied to a control electrode of the fourth transistor, the carry input signal is supplied to control electrodes of the second and third transistors, and wherein a contact point between the second and third transistors is connected to a carry output terminal.

4. The parallel adder of claim 3, wherein said sum output controller comprises:

a first logic-gate that logically processes the first control signal; and a second logic-gate that logically processes an output signal from the first logic-gate and the second control signal.

5. The parallel adder of claim 4, wherein the second logic-gate is a NAND gate.

6. The parallel adder of claim 4, wherein said sum output unit couples an output terminal of the sum output controller to a sum output terminal through fifth and sixth transistors coupled in parallel and a first inverter.

7. The parallel adder of claim 6, wherein said sum output unit of said each full adder applies the carry input signal to a control electrode of the fifth transistor and a first electrode of a seventh transistor via a second inverter, wherein the carry input signal is applied to a control electrode of the sixth transistor and a first electrode of an eighth transistor, wherein the output terminal of the sum output controller is coupled to control electrodes of the seventh and eighth transistors, and wherein second electrodes of the seventh and eighth transistors are coupled to the input of the first inverter.

8. The parallel adder of claim 7, wherein said logic combination unit comprises:

a first NOR-gate for NORing the input signals to generate the first control signal; and a first NAND-gate for NANDing the input signals to generate the second control signal.

9. The parallel adder of claim 3, wherein the first and second transistors are PMOS transistors, the third and fourth transistors are NMOS transistors and the control electrodes are gate electrodes.

10. The parallel adder of claim 1, wherein said sum output unit further comprises:

an inverter that outputs the sum output signal; and a second transmission gate that inputs the carry input signal, wherein an output of the second transmission gate is connected to an output of the first transmission gate at an input to the inverter, and wherein the first transmission gate and the second transmission gate are respectively driven by the third control signal and the carry input signal.

11. The parallel adder of claim 1, wherein said carry output unit couples a power terminal to a ground terminal through first and second transistors, wherein second electrodes of the first and second transistors are coupled to a carry output terminal and the output signal of the buffer.

12. The parallel adder of claim 11, wherein the first transistor is an NMOS transistor and the second transistor is a PMOS transistor and the second electrodes are drain electrodes.

13. A full adder comprising:

a first unit to generate one of a carry output and an inverted carry output that includes a carry output generator receiving one of first and second addition bits and inverted first and second addition bits and a carry input and an inverted carry input to generate one of a carry output and an inverted carry output and first and second signals; and a second unit to generate a sum output, wherein the second unit comprises, a sum control unit that receives the first and second control signals and generates a third signal, and a sum output unit further comprising, a first transmission gate coupled to the sum control unit to receive the third signal, wherein the first transmission gate is driven by at least one of the carry input signal and the inverted carry input, and a second transmission gate that receives at least one of the carry input and the inverted carry input and is connected to the first transmission gate at a common output node, wherein the second transmission gate is driven by the third signal such that the sum output is provided at the common output node.

14. The full adder of claim 13, wherein the sum control unit comprises:

an inverter that receives one of the first and second signals; and a logic gate that logically processes the output of the inverter and the other of the first and second signals, wherein an output of the logic gate is input to the first transmission gate, and wherein said at least one of the carry input and the inverted carry input is provided at an input of the second transmission gate.

15. The full adder of claim 14, wherein the first unit comprises:

first and second logic gates that receive the first and second addition bits to output the first and second signals;

a first plurality of transistors coupled in series between first and second potentials;

a second plurality of transistors coupled in series between the first and second potentials to output the carry output, wherein the carry input drives a first portion of the first plurality of transistors, and wherein the first and second signals drive a second portion of the first plurality of transistors and the second plurality of transistors.

16. The full adder of claim 15, wherein the first and second logic gates are a NAND gate and a NOR gate, and wherein the first and second potentials are a power supply voltage and a ground voltage.

17. A parallel adder comprising a plurality of adders, wherein each of the adders comprises:

a first unit to generate one of a carry output and an inverted carry output that receives one of first and second addition bits and inverted first and second addition bits, and one of a carry input and an inverted carry input to generate one of the carry output and an inverted carry output and first and second control signals, wherein the first unit comprises, first and second logic gates that receive the first and second addition bits to output the first and second signals, a first plurality of transistors coupled in series between first and second potentials, and a second plurality of transistors coupled in series between the first and second potentials to output the carry output, wherein the carry input drives a first portion of the first plurality of transistors, and wherein the first and second signals drive a second portion of the first plurality of transistors and the second plurality of transistors; and a second unit to generate a sum output, wherein the second unit comprises,     a sum control unit that receives the first and second control signals and generates a third signal, the sum control unit having         an inverter that receives one of the first and second signals, and         a logic gate that logically processes the output of the inverter and the other of the first and second signals, wherein an output of the logic gate is input to the first transmission gate, and wherein said at least one of the carry input and the inverted carry input is provided at an input of the second transmission gate, and     a sum output unit having         a first transmission gate coupled to the sum control unit to receive the third signal, wherein the first transmission gate is driven by at least one of the carry input signal and the inverted carry input signal, and         a second transmission gate that receives at least one of the carry input and the inverter carry input and is connected to the first transmission gate at a common output node, wherein the second transmission gate is driven by the third signal such that the sum output is provided at the common output node.

* * * * *